US009619187B2

(12) United States Patent
Asakura

(10) Patent No.: US 9,619,187 B2
(45) Date of Patent: Apr. 11, 2017

(54) TECHNIQUE FOR COMMUNICATING PRINTER AUTHENTICATION INFORMATION FOR ACQUIRING PRINT DATA FROM SERVER

(71) Applicant: Brother Kogyo Kabushiki Kaisha, Nagoya-shi, Aichi-ken (JP)

(72) Inventor: Hirotaka Asakura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/795,935

(22) Filed: Jul. 10, 2015

(65) Prior Publication Data
US 2016/0011830 A1 Jan. 14, 2016

(30) Foreign Application Priority Data

Jul. 11, 2014 (JP) .................. 2014-143617

(51) Int. Cl.
*G06F 3/12* (2006.01)
*H04W 76/02* (2009.01)
*G06K 15/00* (2006.01)

(52) U.S. Cl.
CPC .......... *G06F 3/1229* (2013.01); *G06F 3/1204* (2013.01); *G06F 3/1236* (2013.01);
(Continued)

(58) Field of Classification Search
CPC ............. H04L 29/08072; G06F 3/1204; G06F 3/1229; G06F 3/1236; G06F 3/1285; G06F 3/1292; H04W 76/064; H04W 4/008
(Continued)

(56) References Cited

U.S. PATENT DOCUMENTS

2013/0260683 A1 10/2013 Suzuki et al.
2014/0313539 A1* 10/2014 Kawano .................. G06F 21/44
358/1.14
(Continued)

FOREIGN PATENT DOCUMENTS

JP 2004-029881 A 1/2004
JP 2007-274214 A 10/2007
JP 2012-194856 A 10/2012

OTHER PUBLICATIONS

Wi-Fi Alliance Technical Committee P2P Task Group, "Wi-Fi Peer-to Peer (P2P) Technical Specification", Version 1.1, pp. 1-159.
(Continued)

*Primary Examiner* — Gabriel Garcia
(74) *Attorney, Agent, or Firm* — Banner & Witcoff, Ltd.

(57) ABSTRACT

A terminal device may send a registration request, which requests the server to register virtual printer relation information related to a virtual printer, to a server, and communicate a wireless profile with an existent printer using a first terminal interface. The wireless profile may be used in a wireless network, which is established by using a second terminal interface, and is a wireless network to which both the terminal device and the existent printer are to belong. The terminal device may establish a belonging state, which is a state in which both the terminal device and the existent printer belong to the wireless network, using the second terminal interface, and send authentication information to the existent printer via the established wireless network. The authentication information may be associated with the virtual printer relation information in the server.

21 Claims, 7 Drawing Sheets

(52) U.S. Cl.
CPC .......... *G06F 3/1288* (2013.01); *G06F 3/1292* (2013.01); *H04W 76/02* (2013.01)

(58) Field of Classification Search
USPC ...... 358/1.1, 1.13, 1.14, 1.15; 709/201, 203, 709/230; 455/41.1, 3.01
See application file for complete search history.

(56) References Cited

U.S. PATENT DOCUMENTS

| | | | |
|---|---|---|---|
| 2015/0092607 A1* | 4/2015 | Ando | H04W 76/02 370/255 |
| 2015/0126115 A1* | 5/2015 | Yun | H04L 63/0492 455/41.1 |
| 2015/0153980 A1* | 6/2015 | Ito | G06F 3/1236 358/1.14 |

OTHER PUBLICATIONS

"What is Google Cloud Print", online, retrieved Jul. 3, 2014, <URL: https://developers.google.com/cloud-print/>.

* cited by examiner

Print Process: Case that Printer Is Not Capable of Communicating with Print Mediation Server

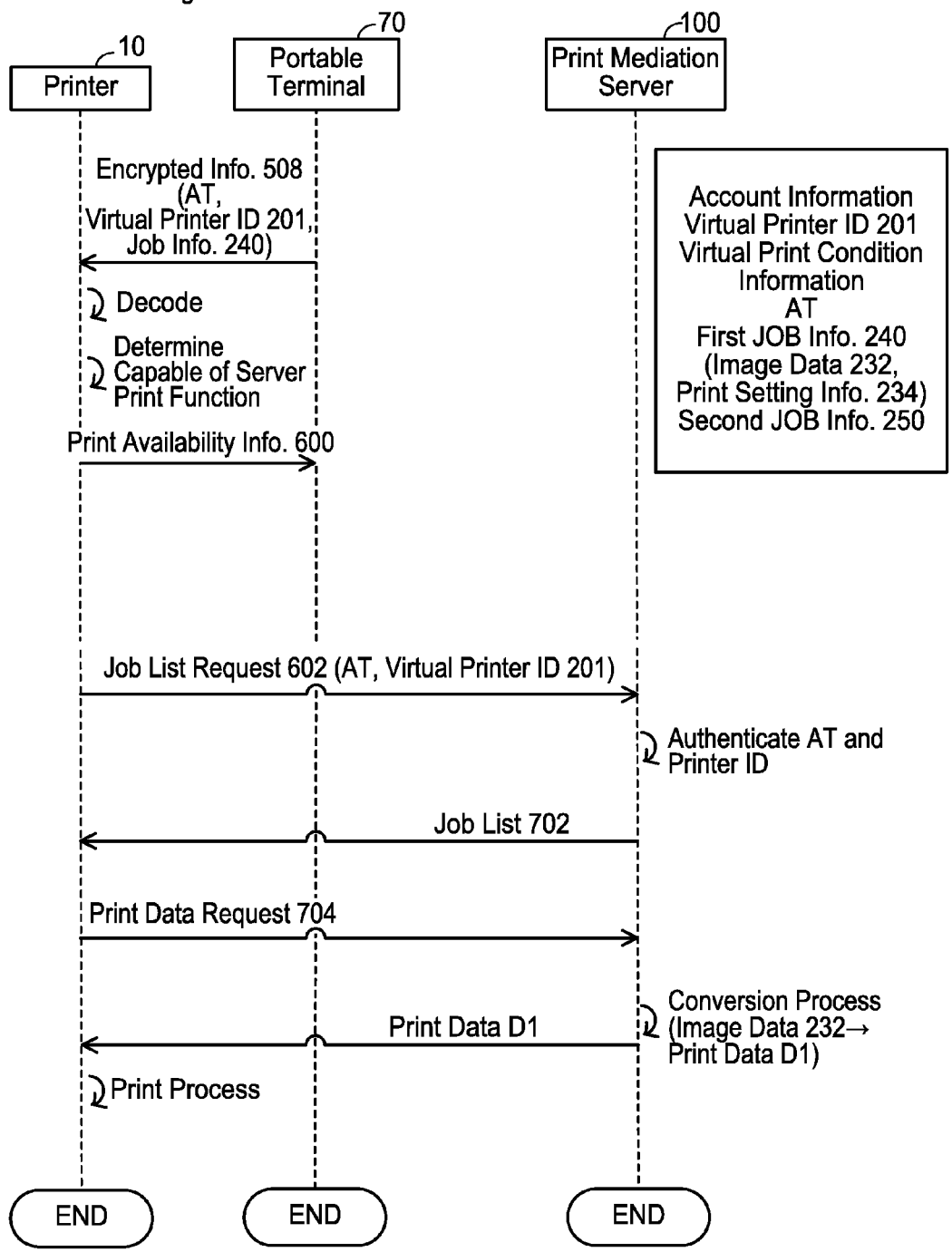

TECHNIQUE FOR COMMUNICATING PRINTER AUTHENTICATION INFORMATION FOR ACQUIRING PRINT DATA FROM SERVER

CROSS-REFERENCE TO RELATED APPLICATIONS

This application claims priority to Japanese Patent Application No. 2014-143617, filed on Jul. 11, 2014, the contents of which are hereby incorporated by reference into the present application.

TECHNICAL FIELD

The present specification discloses a technique in which a terminal device causes a printer to execute print by using a server.

DESCRIPTION OF RELATED ART

Conventionally, a technique is known in which a terminal device sends data to a server, and a printer receives the data sent from the server, and the data received by the printer is printed. For example, a service on the Internet called Google (registered trademark) Cloud Print (called "GCP" below) is disclosed. For example, a user accesses a printer by using a terminal device, and causes the printer to execute a communication with a server which provides the GCP (called "GCP server" below). According to this, the printer can register printer relation information including a name of the printer, a print condition which can be used by the printer, a default setting of the printer, and the like, in the GCP server. Subsequently, for example, the user submits to the GCP server image data which represents an image of a print target by using the terminal device. According to this, the printer can acquire print data, which can be interpreted by the printer, which is created from the image data by the GCP server, and execute print of an image represented by the print data.

SUMMARY

In the above technique, the user need to cause the printer to communicate with the server in order to register the printer relation information in the server.

The present specification discloses a technique in which the printer does not need to communicate with the server in order to register the printer relation information in the server.

The present application discloses a terminal device. The terminal device may comprise a first terminal interface configured to execute a wireless communication with an existent printer in accordance with a first scheme; a second terminal interface executing a wireless communication with the existent printer in accordance with a second scheme being different from the first scheme; one or more processors; and a memory storing computer readable instructions. The computer readable instructions, when executed by the one or more processors, may cause the terminal device to: send a registration request to a server, the registration request requesting the server to register virtual printer relation information related to a virtual printer; receive authentication information from the server; communicate a wireless profile with the existent printer using the first terminal interface, the wireless profile configured to be used in a wireless network, which is established by using the second terminal interface, and is a wireless network to which both the terminal device and the existent printer are to belong; establish a belonging state based on the wireless profile and using the second terminal interface, the belonging state being a state in which both the terminal device and the existent printer belong to the wireless network; and send authentication information to the existent printer via the established wireless network using the second terminal interface, the authentication information being associated with the virtual printer relation information in the server, and configured to be used when the existent printer acquires print data of a print target stored in the server from the server.

The present application discloses a printer. The printer may comprise a communication unit configured to execute a wireless communication with an interface of a terminal device that executes a wireless communication in accordance with a first scheme; a first printer interface configured to execute a wireless communication with the terminal device in accordance with a second scheme being different from the first scheme; one or more processors; and a memory storing computer readable instructions. The computer readable instructions, when executed by the one or more processors, may cause the printer to: communicate a wireless profile with the terminal device using the communication unit the wireless profile configured to be used in a wireless network, which is established by using the first printer interface, and is a wireless network to which both the printer and the terminal device are to belong; establish a belonging state based on the wireless profile and using the first printer interface, the belonging state being a state in which both the printer and the terminal device belong to the wireless network; receive authentication information from the terminal device via the established wireless network using the first printer interface, the authentication information having been stored in a server by being associated to print data, and configured to be used when the printer acquires the print data from the server; and acquire the print data from the server using the received authentication information.

Moreover, a control scheme, a computer program and a non-transitory computer-readable recording medium which stores the computer program, for achieving any of the above devices (i.e., terminal device or printer), are also new and useful. Further, a communication system comprising the above communication device and the terminal device and printer (i.e., existent printer), and a communication system comprising the above terminal device, the printer (i.e., the existent printer) and the server, are also new and useful.

BRIEF DESCRIPTION OF THE DRAWINGS

FIG. 7 shows a sequence diagram illustrating a case where, the print process, the printer is capable of a print process.

DETAILED DESCRIPTION

First Embodiment

Figure 1:
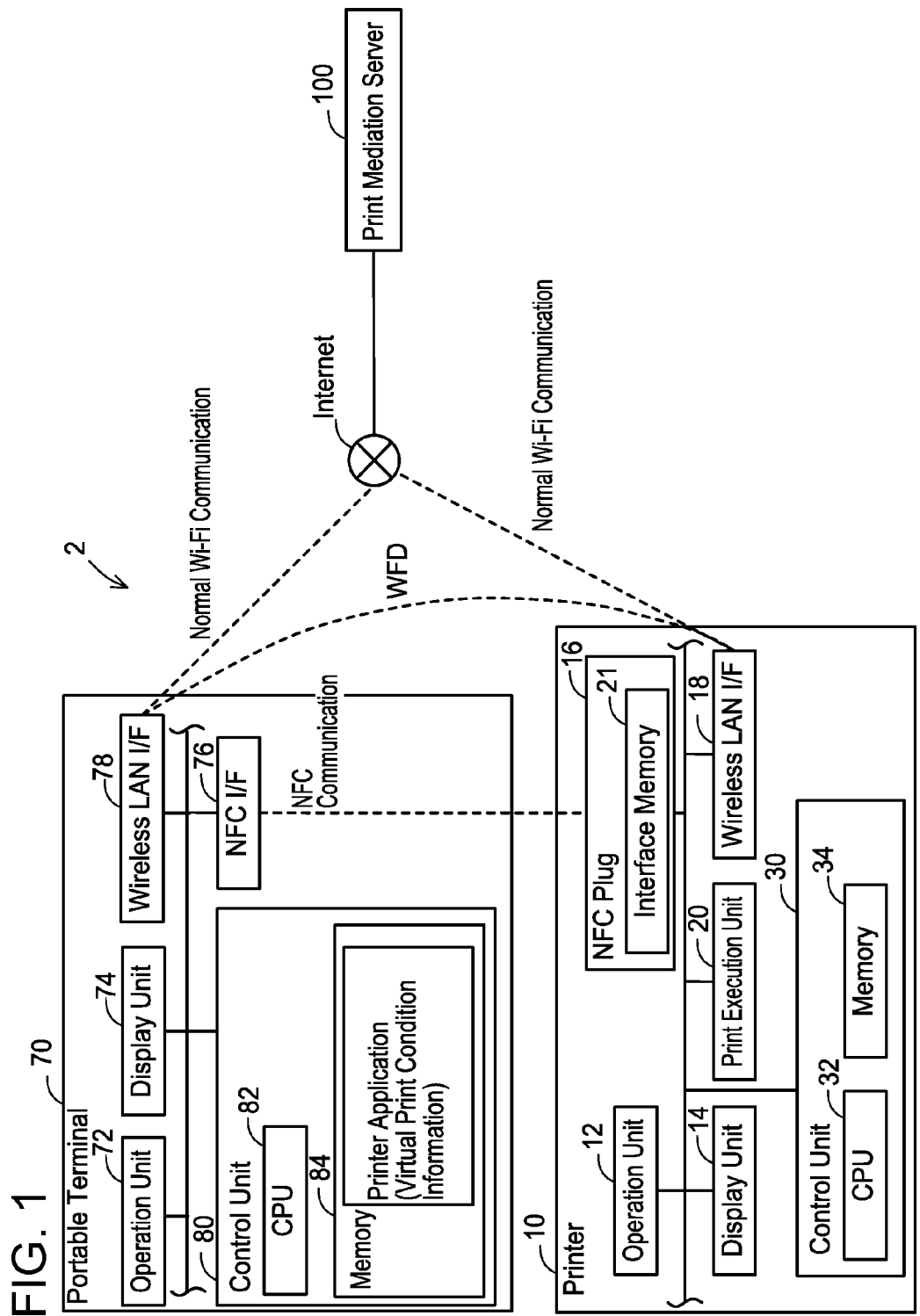
FIG. 1 shows the configuration of a communication system.

As illustrated in FIG. 1, a communication system 2 comprises a printer 10, a portable terminal 70 and a print mediation server 100. Each of the devices 10, 70, 100 can execute a communication with each other via the Internet.

(Configuration of Printer 10)

The printer 10 is a peripheral apparatus (i.e., peripheral apparatus of a PC or the like) which can execute print function. The printer 10 comprises an operation unit 12 and a display unit 14. Furthermore, the printer 10 comprises an NFC (abbreviation of Near Field Communication) plug 16. Further, the printer 10 comprises a wireless LAN (abbreviation of Local Area Network) interface 18. Furthermore, the printer 10 comprises a print execution unit 20. Further, the printer 10 comprises a control unit 30. Each of the units 12 to 30 is connected to a bus line (a reference numeral is not shown). Below, the interface will be described as an "I/F".

The operation unit 12 comprises a plurality of keys. A user can give various instructions to the printer 10 by operating the operation unit 12. The user can select, by operating the operation unit 12, whether to permit execution of as server print function for executing a print process via the print mediation server 100, to be described. The display unit 14 is a display for displaying various pieces of information. The print execution unit 20 is a printing unit such as an ink jet printing or a laser printing scheme.

The NFC plug 16 is an I/F for executing a wireless communication (called an "NFC communication" below) in accordance with the NFC scheme for a so-called near field wireless communication. That is, the NFC plug 16 is an IC chip or a communication circuit. The NFC scheme is a wireless communication scheme based on the international standard of e.g., ISO/IEC 21481 or 18092. An I/F called an NFC forum device, and an I/F called an NFC forum tag are known as types of I/F for executing an NFC communication. The NFC plug 16 is an NFC forum tag, and functions as an IC tag of the International Standard of ISO/IEC 21481 or 18092.

The NFC forum device is an I/F capable of selectively operating in any mode of P2P (abbreviation of Peer To Peer) mode, R/W (abbreviation of Reader/Writer) mode, and CE (abbreviation of Card Emulation) mode. For example, in a case where an NFC I/F of a first apparatus and an NFC I/F of a second apparatus are both operating in P2P mode, the first and second apparatuses can execute two-way communication of information. Further, for example, in a case where the NFC I/F of the first apparatus is operating in Reader mode of R/W mode, and the NFC I/F of the second apparatus is operating in CE mode, the first apparatus can read information from the second apparatus, i.e., can receive information from the second apparatus. Further, for example, in a case where the NFC I/F of the first apparatus is operating in Writer mode of R/W mode, and the NFC I/F of the second apparatus is operating in CE mode, the first apparatus can read information into the second apparatus, i.e., can send information to the second apparatus.

For example, the NFC forum tag of the NFC plug 16 is not an I/F capable of selectively operating in any mode of the above three modes, but is an I/F functioning only as an IC tag. For example, in a case where an NFC I/F 76 of the portable terminal 70 is operating in the Reader mode of R/W mode, the portable terminal 70 can read information from the NFC plug 16 of the MFP 10, i.e., can receive information from the MFP 10.

Due to not being an I/F capable of selectively operating in any of the above three modes, the configuration of the NFC forum tag is simpler than the NFC forum device. That is, the configuration of the IC chip is simple. Generally speaking, an IC chip functioning as an NFC forum tag is cheaper than an IC chip functioning as an NFC forum device.

In the present embodiment, the NFC plug 16 comprises an interface memory 21 for storing information supplied, from the control unit 30 for a long period (e.g., a period until other information is supplied from the control unit 30). The stored contents of the interface memory 21 can be changed by a CPU 32.

The interface memory 21 stores server print adaptability information (called "adaptability information" below) indicating whether the MFP 10 is permitted to execute a server print function. The server print function includes a process of receiving print data from the print mediation server 100, and a print process of the received print data. The CPU 32 updates the adaptability information being stored in the interface memory 21 in response to whether the user has selected to permit execution of the server print function. For example, in the case where a state of permitting execution of the server print function has been changed, by the user operating the operation unit 12, to a state of not permitting execution of the server print function, the CPU 32 updates the adaptability information indicating that execution of the server print function is permitted to another adaptability information indicating that execution of the server print function is not permitted. Instead of the adaptability information, a wireless profile (to be described) and an existent printer ID (to be described), the interface memory 21 may store a URL for accessing a help site on the Internet. For example, in the case where a device error of the print execution unit 20 has occurred (e.g., cover open, or an error by which the print process cannot be executed, such as toner, ink or printing paper out), the CPU 32 stores, in the interface memory 21, a URL corresponding to the error (e.g., a URL corresponding to an image indicating content of the error, a URL corresponding to an image describing a resolution scheme of the error). Moreover, in a modification, the interface memory 21 may store the URL for accessing the help site together with the adaptability information, wireless profile and existent printer ID.

The wireless LAN I/F 18 is an I/F for executing wireless communication in accordance with the WFD (abbreviation of Wi-Fi Direct (registered trademark)) scheme (called "WFD communication" below). Details of the WFD scheme are described in "Wi-Fi Peer-to-Peer (P2P) Technical Specification Version 1.1." created by the Wi-Fi Alliance. Further, details of the WFD scheme are also disclosed in US Patent Application No. 2013/0260683 and, in the present specification, are cited by reference to the literature.

Below, an apparatus capable of executing a WFD communication in accordance with the WFD scheme, such as the MFP 10, etc., is called a "WFD compatible apparatus". In the WFD standard described above, three states are defined as the states of the WFD compatible apparatus: Group Owner state (called "G/O state" below), client state (called "CL state" below), and device state. The WFD compatible apparatus is normally capable of selectively operating in one state of the three states. Further, below, a G/O state WFD compatible apparatus is called a "G/O apparatus" and a CL state WFD compatible apparatus is called a "CL apparatus". Further, below, the WFD network may be referred to as "WFDNW".

The interface memory 21 stores a wireless profile for the WFD. The wireless profile includes an SSID (abbreviation of Service Set IDentifier), authentication scheme, encryption scheme, password, and MAC address of the MFP 10. The interface memory 21 further stores the existent printer ID, which is a printer ID of the printer 10.

The MFP 10 of the present embodiment is a WFD compatible apparatus, but cannot operate in the CL state in the present embodiment. Further, the MFP 10 is not equipped with a program for executing a G/O negotiation with another WFD compatible apparatus. That is, the MFP 10 is operating in the G/O state.

Here, differences between the NFC plug 16 and the wireless LAN I/F 18 will be described. A communication speed of a wireless communication via the wireless LAN I/F 18 (e.g., a maximum communication speed is 11 to 600 Mbps) is faster than a communication speed of a wireless communication via the NFC plug 16 (e.g., a maximum communication speed is 100 to 424 Kbps). Further, a frequency of a carrier wave (e.g., a 2.4 GHz band, a 5.0 GHz band) upon the wireless communication via the wireless LAN I/F 18 is different from a frequency of a carrier wave (e.g., a 13.56 MHz band) upon the wireless communication via the NFC plug 16. For example, in the case where the distance between the NFC plug 16 of the printer 10 and an NFC I/F of another apparatus such as, for example, the portable terminal 70, is approximately 10 cm or less, the NFC I/F of the other apparatus is operating in Reader mode, then it is possible to read information such as the wireless profile or the like that is being stored in the interface memory 21 of the NFC plug 16.

Further, even in the case where the distance between the wireless LAN I/F 18 of the printer 10 and a wireless LAN I/F of another apparatus such as, for example, the portable terminal 70, is 10 cm or less, or is 10 cm or more (e.g., maximally approximately 100 m), the control unit 30 is capable of executing a normal Wi-Fi communication with the other apparatus via the wireless LAN I/F 18. Moreover, in the normal Wi-Fi communication, the printer 10 executes a wireless communication with the other apparatus via an apparatus having an access point function. That is, a maximum distance at which the printer 10 can perform a wireless communication with another apparatus via the wireless LAN I/F 18 is greater than a maximum distance at which the printer 10 can perform a wireless communication with another apparatus via the NFC plug 16.

The control unit 30 comprises the CPU 32 and a memory 34. The CPU 32 is a processor which performs various processes in accordance with a program stored in the memory 34. The memory 34 is configured by a RAM, a ROM, a hard disk and the like. The memory 34 stores not only the above program, but also various pieces of data created or acquired in a process in which the printer 10 executes various processes.

(Configuration of Portable Terminal 70)

The portable terminal 70 is a portable terminal device such as a mobile telephone such as e.g., a smartphone, a PDA, a notebook PC, a tablet PC, a portable music playback device or a portable movie playback device. The portable terminal 70 comprises an operation unit 72, a display unit 74, the NFC I/F 76, a wireless LAN I/F 78, and a control unit 80. Each of the units 72 to 80 is connected to a bus line (a reference numeral is not shown).

The operation unit 72 comprises a plurality of keys. The user can input various instructions to the portable terminal 70 by operating the operation unit 72. The display unit 74 is a display for displaying various pieces of information. The NFC I/F 76, unlike the NFC plug 16, is an NFC forum device. The wireless LAN I/F 78 is the same as the wireless LAN I/F 18 of the printer 10.

Differences between the NFC I/F 76 and the wireless LAN I/F 78 will be described. A communication speed of a wireless communication via the wireless LAN I/F 78 is faster than a communication speed of a wireless communication via the NFC I/F 76 (for example, a maximum communication speed is 100 to 424 Kbps). Further, a frequency of a carrier wave upon a wireless communication via the wireless LAN I/F 78 is different from a frequency of a carrier wave (e.g., a 13.56 MHz band) upon a wireless communication via the NFC I/F 76. Further, for example, in the case where the distance between the NFC I/F 76 of the portable terminal 70 and the NFC plug 16 of another apparatus (e.g., the printer 10) is approximately 10 cm or less, the control unit 30 is capable of executing an NFC communication with the other apparatus via the NFC I/F 76. That is, a maximum distance at which the portable terminal 70 can perform a wireless communication with another apparatus via the wireless LAN I/F 78 is greater than a maximum distance at which a wireless communication can be performed with another apparatus via the NFC I/F 76.

The control unit 80 comprises a CPU 82 and a memory 84. The CPU 82 is a processor which performs various processes in accordance with a program stored in the memory 84. The memory 84 is configured by a RAM, a ROM, a hard disk and the like. The memory 84 stores not only the above program but also various pieces of data created or acquired in a process in which the portable terminal 70 executes various processes.

The memory 84 further stores a printer application (called "printer app." below) which causes the printer 10 to execute print by using the print mediation server 100. The printer app. is an application provided by a vendor of the printer 10. The printer app. may be installed to the portable terminal 70 from a server on the Internet or may be installed to the portable terminal 70 from a medium shipped together with the printer 10.

(Configuration of Print Mediation Server 100)

The print mediation server 100 is a server which is located on the Internet, and is, for example, a GCP server provided by Google (registered trademark). In this regard, in a modification, the print mediation server 100 may be, e.g., a server provided by the vendor of the printer 10 or may be a server provided by a business operator different from the vendor of the printer 10.

The print mediation server 100 is a server for executing an intermediation of a print between an external apparatus, such as the portable terminal 70, and a printer, such as the printer 10. That is, the print mediation server 100 converts image data submitted from the external apparatus, generates print data in a data format which can be interpreted by the printer, and supplies the print data to the printer. Therefore, even when the external apparatus does not comprise a printer driver for converting the image data into the print data, the external apparatus can cause the printer to execute print process by submitting the image data to the print mediation server 100.

(Advance Preparation)

As described above, for example, the portable terminal 70 can cause the printer 10 to execute print process via the print mediation server 100. Various processes for this print process will be described below with reference to FIG. 2 to FIG. 7. Moreover, the user of the portable terminal 70 needs to execute the following advance preparation to achieve an operation of the portable terminal 70 disclosed in FIG. 2 to FIG. 7.

That is, the user needs to register account information in the print mediation server 100 by using, for example, the portable terminal 70. The account information includes, for example, a user ID, a password and the like. Moreover, the user may register the account information in the print mediation server 100 by using another apparatus (e.g., a PC) instead of using the portable terminal 70. When the account information of the user is registered in the print mediation server 100, the user can cause the printer 10 to execute print process via the print mediation server 100 by using the portable terminal 70.

Figure 2:
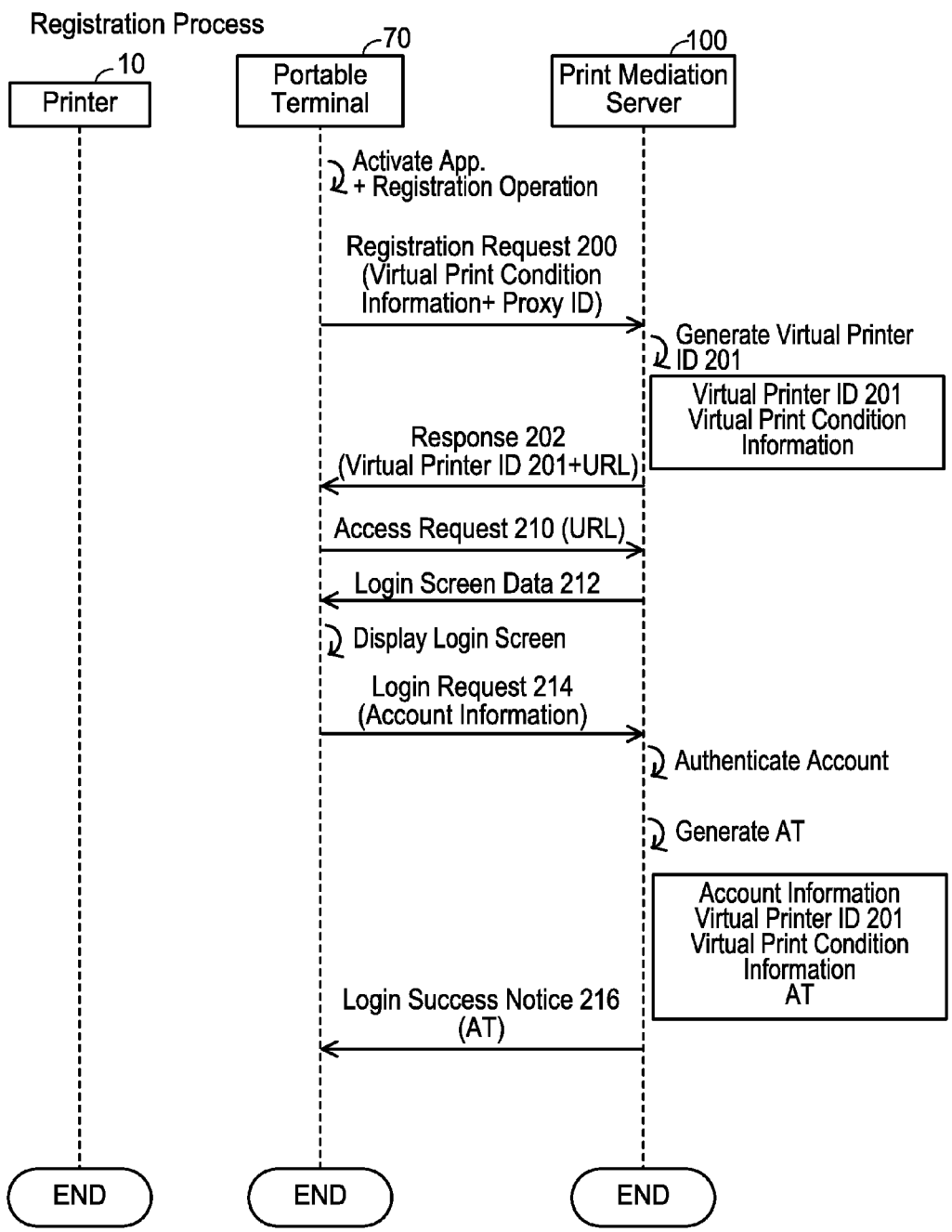
FIG. 2 shows a sequence diagram of a registration process.

(Registration Process; FIG. 2)

Next, a registration process for registering information which is necessary for the portable terminal 70 in the print mediation server 100 will be described with reference to FIG. 2. In the present embodiment, the registration process using OAuth is executed.

In the registration process, the user of the portable terminal 70 may not be present near the printer 10. That is, for example, in a situation that the printer 10 is located at home and the user goes out carrying the portable terminal 70, the user can register various pieces of information in the print mediation server 100 by using the portable terminal 70.

The user of the portable terminal 70 first activates the printer app. installed in the portable terminal 70, and selects a button indicating "Registration" on a screen which is displayed in accordance with the printer app. (i.e., executes a registration operation).

The CPU 82 first reads virtual print condition information registered in advance in the printer app., from the memory 84. The virtual print condition information is information indicating virtual print conditions which can be used by a virtual printer, not an existent printer (e.g., the printer 10), and is information determined in advance by the vendor of the printer 10. Moreover, as shown in FIG. 1, the virtual print condition information is registered in advance in the printer app. Hence, the virtual print condition information is not acquired from the existent printer (e.g., the printer 10), but is stored in advance in the memory 84.

The virtual print conditions include, for example, sizes of print sheets (i.e., sheet sizes) on which images are to be printed, information indicating whether duplex printing can be executed, the number of colors (e.g., monochrome print or color print), and the like. In the present embodiment, the virtual print conditions determined in advance include "A4" and "B5" as sheet sizes, "not applicable (N/A)" indicating that duplex printing cannot be executed, and "Monochrome print" and "Color print" as the number of colors. The virtual print conditions may further include other conditions such as page orientation (e.g., landscape print and portrait print).

Next, the CPU 82 of the portable terminal 70 acquires a proxy ID of the portable terminal 70 (i.e., an ID for identifying the portable terminal 70) from the memory 84. Then, the CPU 82 sends a registration request 200 including the virtual print condition information and the proxy ID to the print mediation server 100 via the wireless LAN I/F 78 (i.e., via the Internet). Moreover, a URL of the print mediation server 100 (i.e., a URL of a sending destination of the registration request 200) is registered in advance in the printer app. Below, unless described in particular, the URL of the request sending destination may be a URL registered in advance in the printer app. In this regard, the URL of the request sending destination may be a URL acquired from the print mediation server 100 before the request is sent. Moreover, in the present embodiment, the CPU 82 performs communication with the print mediation server 100 via the wireless LAN I/F 78 (i.e., via the Internet).

When receiving the registration request 200 from the portable terminal 70, the print mediation server 100 generates a virtual printer ID 201 for identifying a registration target printer by using the proxy ID included in the registration request 200. Since the portable terminal 70 does not specify an existent printer (e.g., the printer 10) as the registration target printer (i.e., since the registration request 200 does not include print condition information of the existent printer, a proxy ID of the existent printer and the like), the virtual printer ID 201 generated by the print mediation server 100 is an ID for identifying a virtual printer.

The print mediation server 100 associates the generated virtual printer ID 201 of the virtual printer with the virtual print condition information included in the registration request 200 and stores them. In FIG. 2, boxes on the right of the broken line corresponding to the print mediation server 100 indicate how each piece of information in the boxes is associated with each other. The same also applies to FIG. 3 and subsequent figures.

Next, the print mediation server 100 sends, to the portable terminal 70, a response 202 including the generated virtual printer ID 201 and a login URL which indicates a location of login screen data 212, described below.

When receiving the response 202 from the print mediation server 100 via the wireless LAN I/F 78, the CPU 82 of the portable terminal 70 stores in the memory 84 the virtual printer ID 201 included in the response 202. Next, the CPU 82 sends an access request 210 to the print mediation server 100 with the login URL, included in the response 202, as the sending destination.

When receiving the access request 210 from the portable terminal 70, the print mediation server 100 sends the login screen data 212 to the portable terminal 70. The login screen data 212 is data which represents a login screen for inputting account information (i.e., a user ID, a password and the like).

When receiving the login screen data 212 from the print mediation server 100, the CPU 82 of the portable terminal 70 causes a login screen represented by the login screen data 212 to be displayed in the display unit 74. The user inputs into the portable terminal 70, by using the operation unit 72, the account information registered in the print mediation server 100 upon the above advance preparation. In this case, the CPU 82 sends a login request 214 including the inputted account information to the print mediation server 100.

Moreover, the account information is inputted to the portable terminal 70 by the user in the present embodiment. However, in a modification, the memory 84 of the portable terminal 70 may store the account information when, for example, the above advance preparation is executed by using the portable terminal 70. In this case, the CPU 82 of the portable terminal 70 may acquire the account information from the memory 84 without having the user input the account information, and send the login request 214 including the account information to the print mediation server 100. Moreover, in processes from FIG. 3 onward, the present modification may be adopted in a situation that a login request is sent from the portable terminal 70 to the print mediation server 100.

When receiving the login request 214 from the portable terminal 70, the print mediation server 100 executes authentication of the account information included in the login request 214. Specifically, the print mediation server 100 determines whether or not the account information included in the login request 214 is already registered in the print mediation server 100. When determining that the account information is not registered, that is, when failing to authenticate the account information, the print mediation server 100 sends a login failure notice to the portable terminal 70, although not illustrated. In this case, the registration process ends without executing subsequent processes.

On the other hand, when determining that the account information is already registered, that is, when succeeding to authenticate the account information, the print mediation server 100 generates a token which is a unique character string. The token is information for authentication which is used in subsequent processes (e.g., a print process in FIG. 5). The token generated herein is referred to as an "AT (abbreviation of Authentication (or Access) Token)" below.

Next, the print mediation server 100 associates the successfully authenticated account information, the virtual printer ID 201 of the virtual printer, the virtual print condition information and the generated AT with each other and stores them. Then, the print mediation server 100 sends a login success notice 216 including the generated AT to the portable terminal 70.

When receiving the login success notice 216 from the print mediation server 100, the CPU 82 of the portable terminal 70 stores the AT included in the login success notice 216 in the memory 84. According to this, the registration process is finished.

As described above, in the registration process, a method is adopted of registering the virtual printer ID 201 and virtual print condition information of the virtual printer in the print mediation server 100 instead of registering existent printer ID and print condition information of an existent printer (e.g., the printer 10). That is, the portable terminal 70 sends the registration request 200 to the print mediation server 100, and registers the virtual printer ID 201 and virtual print condition information of the virtual printer in the print mediation server 100. Hence, the user does not have to cause the printer 10 to execute a communication with the print mediation server 100 to register the virtual printer ID 201 and the virtual print condition information (and moreover, the AT) in the print mediation server 100.

Figure 3:
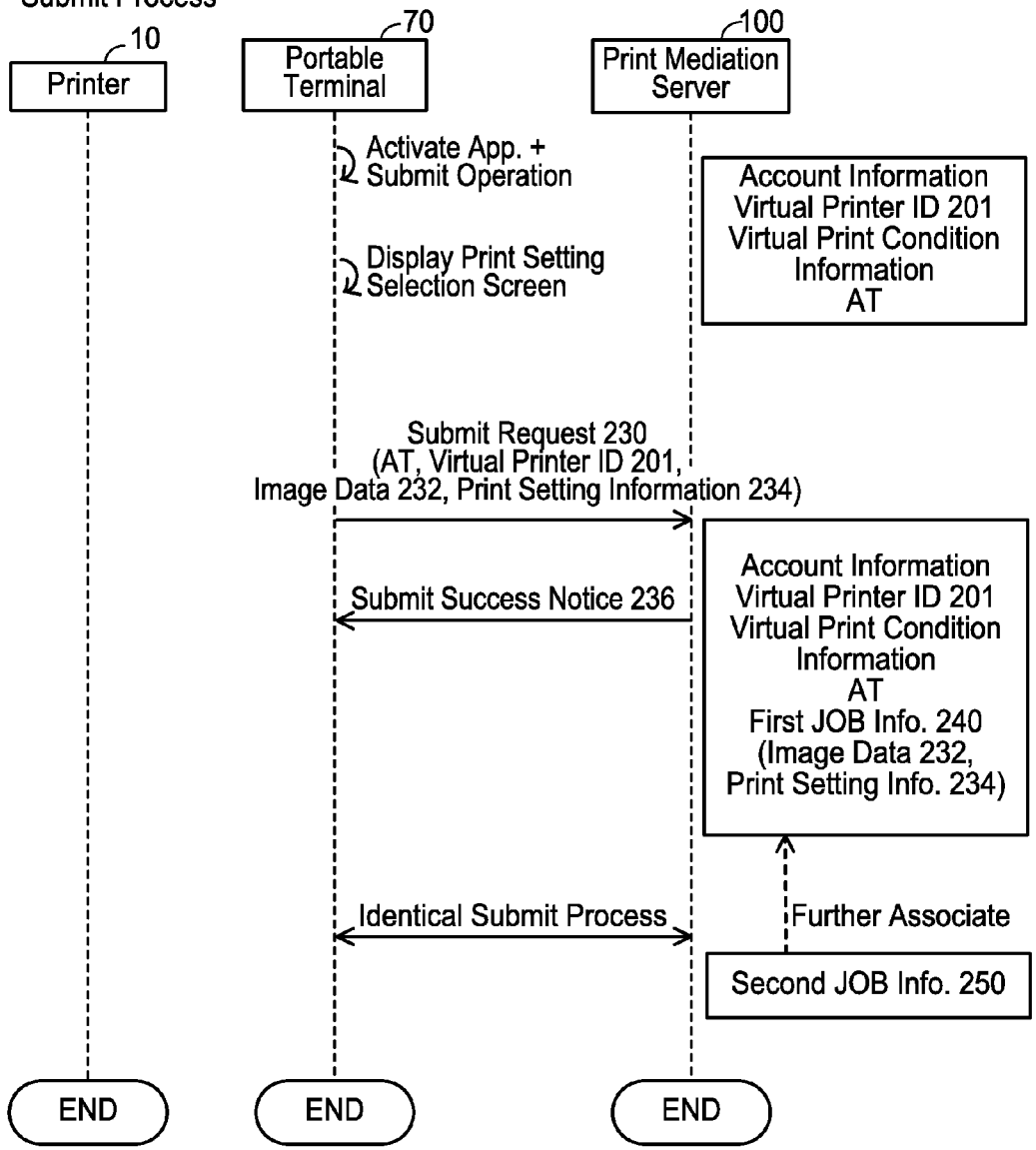
FIG. 3 shows a sequence diagram of a submit process.

(Submit Process; FIG. 3)

Next, a submit process for the portable terminal 70 to submit image data which represents a print target image to the print mediation server 100 will be described with reference to FIG. 3. As in the registration process, in the submit process the user of the portable terminal 70 need not be present near the printer 10. For example, the user can submit image data which represents an image captured by the portable terminal 70 at a visiting place, to the print mediation server 100.

In the case of desiring to submit image data to the print mediation server 100, the user of the portable terminal 70 activates the printer app. Further, the user selects a button indicating "Submit" on a screen displayed in accordance with the printer app., and specifies the image data being stored in the memory 84 of the portable terminal 70 (i.e., executes a submit operation). Moreover, the image data may be in any data format as long as the image data is data which represents a print target image, and may for example be data in a bitmap format such as JPEG (abbreviation of Joint Photographic Experts Group), may be data in a vector format, may be data in a text format, or may be data in other formats.

When selecting the image data, the CPU 82 of the portable terminal 70 causes a print setting selection screen to be displayed in the display unit 74. Specifically, the CPU 82 obtains the virtual print condition information registered in advance in the printer app. from the memory 84, and causes the print setting selection screen, for causing the user to select a print setting for printing an image from among the virtual print conditions indicated by the virtual print condition information, to be displayed in the display unit 74.

As described above, the virtual print conditions include "A4" and "B5" as sheet sizes, "N/A" indicating that it is not capable of duplex printing, and "Monochrome print" and "Color print" as the number of colors. Consequently, the print setting selection screen has the features of being able to select "A4" or "B5" as the sheet size, and "Monochrome print" or "Color print" as the number of colors.

While looking at the print setting selection screen, the user selects the print setting by using the operation unit 72 to select the sheet size (e.g., "A4") and number of colors (e.g., "Color print"). Since availability of the duplex printing cannot be chosen (i.e., there only is "N/A"), it is therefore incorporated automatically into the print setting.

As will be described in detail below, in the print mediation server 100, print data is generated in accordance with the selected print setting, and the print data is supplied to the printer 10 (see FIG. 7). As described above, the selected print setting is selected from the virtual print conditions, and is not selected from the print conditions which can be actually used by the printer 10. That is, there is no guarantee that the printer 10 can execute a print process in accordance with the selected print setting. In this regard, in the present embodiment, the vendor of the printer 10 determines in advance a print condition which can be used by normal printers (e.g., all printers which are sold by the vendor) as the virtual print condition, and provides the printer app. which includes the virtual print condition information indicating such virtual print conditions. Consequently, in the present embodiment, the printer 10 can properly execute print in accordance with the selected print setting.

When a print setting is selected by the user, the CPU 82 of the portable terminal 70 sends to the print mediation server 100, via the wireless LAN I/F 78, a submit request 230 including the received AT, the virtual printer ID 201 of the virtual printer in the memory 84, image data 232 specified by the user, and print setting information 234 indicating the selected print setting specified by the user.

When receiving the submit request 230 from the portable terminal 70, the print mediation server 100 executes authentication of the AT included in the submit request 230. In case of determining that the AT is being stored (i.e., the case where authentication of the AT succeeds), the print mediation server 100 associates the pieces of information included in the submit request 230 with each other and stores them. As a result, in the print mediation server 100, the information stored at the time of generating a second AT (i.e., the account information, the virtual printer ID 201, the virtual print condition information, the AT) can be associated with first JOB information 240 (i.e., the image data 232 and the print setting information 234). Then, the print mediation server 100 sends a submit success notice 236 to the portable terminal 70.

The CPU 82 of the portable terminal 70 receives the submit success notice 236 from the print mediation server 100 via the wireless LAN I/F 78. According to this, the submit process for submitting the one piece of JOB information 240 ends. Moreover, when the user further desires to submit other image data to the print mediation server 100, the same operation as the above is executed. According to this, the CPU 82 of the portable terminal 70 can submit second JOB information 250 to the print mediation server 100 by executing the same process as the above. As a result, in the print mediation server 100, two pieces of JOB information (i.e., the first and second JOB information 240, 250) are associated with the account information, the virtual printer ID 201, etc. and stored.

(Print Process; FIGS. 4 to 7)

Next, a print process in which the portable terminal 70 causes the printer 10 to execute print in accordance with the first JOB information 240 will be described with reference to FIGS. 4 to 7. In the print process, the user of the portable terminal 70 needs to be present near the printer 10. As described below, this is because the portable terminal 70 and the printer 10 need to execute an NFC communication. Hence, the user, for example, causes the printer 10 to execute print by using the portable terminal 70 after going home from a visiting place.

In the print mediation server 100, the account information, the virtual printer ID 201, the virtual print condition information, the AT, the first JOB information 240, and the second JOB information 250 are associated with each other.

When desiring to cause the printer 10 to execute print in accordance with the first JOB information 240, the user of the portable terminal 70 activates the printer app., and selects a button indicating "Print" on a screen displayed in accordance with the printer app. (i.e., executes a print operation). In this case, the CPU 82 of the portable terminal 70 executes each process illustrated in FIGS. 4 to 7 in accordance with the printer app.

Figure 4:
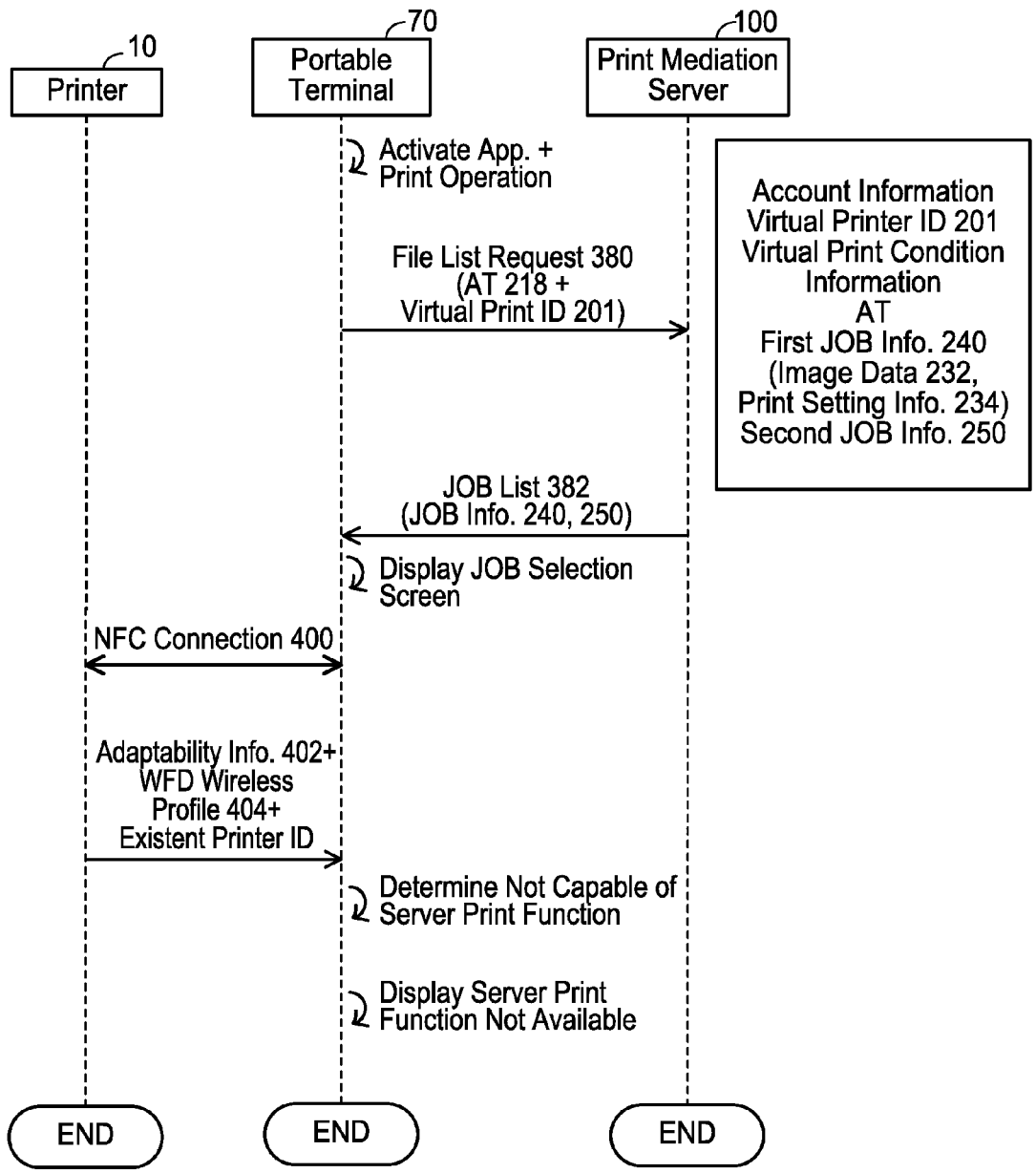
FIG. 4 shows a sequence diagram illustrating a case where, in a print process, a printer is not adapted for a print process using a print mediation server.

(Case that Printer is not Adapted for Print Process Using Print Mediation Server; FIG. 4)

The CPU 82 of the portable terminal 70 first reads the AT and the virtual printer ID 201 (i.e., the information stored in the memory 84 in the registration process of FIG. 2) from the memory 84. Then, the CPU 82 sends a file list request 380 including the AT and the virtual printer ID 201 to the print mediation server 100 via the wireless LAN I/F 78.

When acquiring the list request 380 from the portable terminal 70, the print mediation server 100 executes authentication of the AT and the virtual printer ID 201 included in the file list request 380. Then, in the case of determining that the AT and the virtual printer ID 201 have been registered (i.e., in the case where authentication succeeds), the print mediation server 100 supplies a JOB list 382 which includes the JOB information 240, 250 associated with that information to the portable terminal 70.

When receiving the JOB list 382 from the print mediation server 100 via the wireless LAN I/F 78, the CPU 82 of the portable terminal 70 causes a JOB selection screen to be displayed in the display unit 74 by using the JOB information 240, 250 included in the JOB list 382. The JOB selection screen includes a file name of a file which includes the image data included in the JOB information 240, 250. Consequently, by looking at the JOB selection screen, the user can know the file name of the files which include the image data. Then, the user operates the operation unit 72 to select one or more file names. Below, the description is continued using, as an example, the case where one file name corresponding to the image data 232 included in the JOB information 240 is selected by the user.

Next, the CPU 82 of the portable terminal 70 causes the display unit 74 to display a message prompting the portable terminal 70 to be brought closer to the printer 10. As a result, the user of the portable terminal 70 brings the portable terminal 70 closer to the printer 10. When the distance between the NFC plug 16 of the printer 10 and the NFC I/F 76 of the portable terminal 70 (called "distance between devices" below) changes from a state greater than a predetermined distance (e.g., 10 cm) to a state equal to or less than the predetermined distance, an NFC connection 400, which is an NFC scheme connection, is established between the NFC plug 16 and the NFC I/F 76.

When the NFC connection 400 is established, the CPU 82 reads, from the interface memory 21, by the NFC I/F 76 operating in Reader mode, adaptability information 402, a wireless profile 404, and the existent printer ID, this being the printer ID of the printer 10, which is being stored in the interface memory 21 of the NFC plug 16. According to this configuration, the printer 10 does not need to acquire the adaptability information 402 from a memory of the printer 10 other than the interface memory 21. Next, by using the acquired adaptability information 402, the CPU 82 determines whether execution of the server print function is permitted.

In the case where the adaptability information 402 does not permit execution of the server print function, i.e., in the case where it is indicated that the server print function cannot be executed, the CPU 82 causes a screen indicating that the server print function is not available to be displayed on the display unit 74, and ends the process. According to this configuration, the portable terminal 70 can notify the user that the settings of the printer 10 are set such that the server print function cannot be executed. The user of the portable terminal 70 can know that the settings of the printer 10 are set such that the server print function cannot be executed. According to this, by checking the display unit 74, the user of the portable terminal 70 can execute an operation such as searching for a printer in which the server print function is permitted, or having an administrator of the printer 10 change the settings of the server print function from not capable of executing to capable of executing. Moreover, in a modification, the CPU 32 of the printer 10 may cause a reason for the unavailability of the server print function to be displayed in the display unit 14 of the printer 10 in response to detecting establishment of the NFC connection 400. In this case, the CPU 82 of the portable terminal 70 need not display a screen in the display unit 74 indicating that the server print function is not permitted.

In this case, the portable terminal 70 and the printer 10 do not establish a belonging state in which both the printer 10 and the portable terminal 70 belong to the WFDNW. According to this configuration, it is possible to avoid a situation in which a WFDNW is established between the portable terminal 70 and the printer 10 even though the printer 10 cannot execute the server print function.

Moreover, in the case where the URL of a help site is being stored in the interface memory 21, the CPU 82 may read the URL from the interface memory 21 instead of the adaptability information 402 and the wireless profile 404. Next, in the case of reading the URL of a help site, the CPU 82 may cause the display unit 74 to display a screen for enquiring whether to access the read URL, and end the process. By the user operating the operation unit 72, the printer 10 can cause the portable terminal 70 to access the help site. According to this, the user can acquire the contents of the error of the printer 10 or a resolution scheme of the error from the help site.

Figure 5:
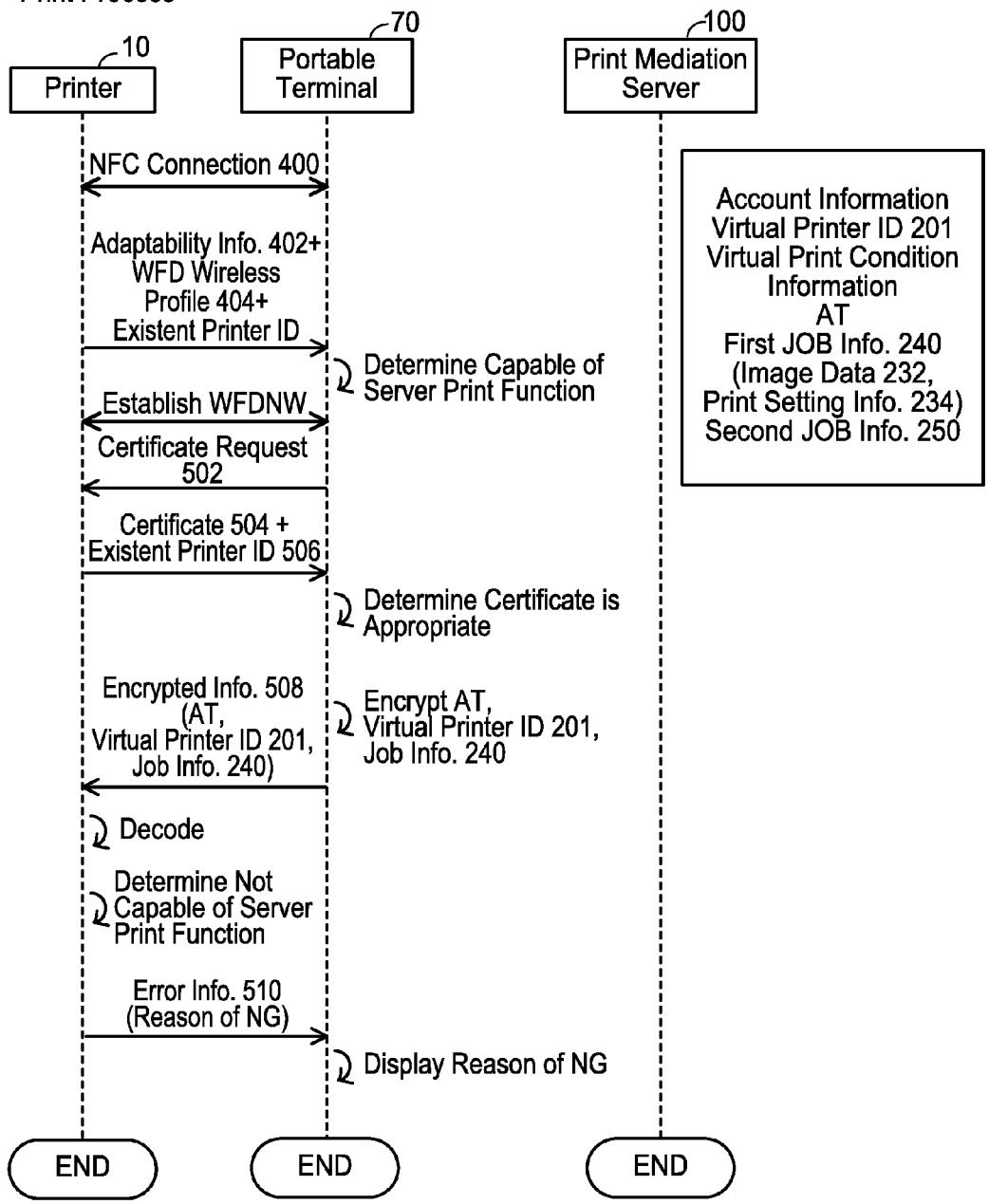
FIG. 5 shows a sequence diagram illustrating a case where, in the print process, the printer is not capable of a print process.

(Case that Printer is not Capable of Print Process; FIG. 5)

In the process of FIG. 5, the processes of the apparatuses 10, 70, 100 described in FIG. 4 are the same until the NFC connection 400 is established, and are therefore omitted. Further, as in FIG. 4, the CPU 82 establishes the NFC connection 400, reads the adaptability information 402 and the wireless profile 404 from the interface memory 21 and, by using the acquired adaptability information 402, determines whether execution of the server print function is permitted.

In the case of determining that the adaptability information 402 permits execution of the server print function, i.e., that the server print function can be executed, and in the case of the URL of a help site not being read, the CPU 82 executes a process for establishing a WFDNW with the CPU 32 of the printer 10. Specifically, the CPU 82 sends a connection request (specifically, a Probe Request) which includes the SSID included in the wireless profile 404 to the printer 10 via the wireless LAN I/F 78.

When the CPU 32 of the printer 10 receives the connection request from the portable terminal 70 via the wireless LAN I/F 18, the CPU 32 and the CPU 82 execute a wireless connection process and, establish a wireless connection between the printer 10 and the portable terminal 70. Specifically, when receiving the connection request (i.e., Probe Request), the CPU 32 sends a Probe Response to a target terminal. Next, the CPU 82 sequentially sends an Authentication Request and an Association Request. The CPU 32 sequentially sends an Authentication Response and an Association Response to the portable terminal 70 in response to the Authentication Request and Association Request. Then, the CPU 32 and the CPU 82 execute a 4-way handshake.

When the above processes end, a wireless connection is established between the printer 10 and the portable terminal 70. Moreover, as described above, the MFP 10 is operating in advance in the G/O state. According to this, the printer 10 is caused to join the portable terminal 70 to the WFDNW as a child station (i.e., CL apparatus). The CPU 32 writes a MAC address of the target terminal in a managing list (i.e., an managing list of the G/O apparatus). According to this, the belonging state is established in which both the printer 10 and the portable terminal 70 belong to the WFDNW. The CPU 82 of the portable terminal 70 can execute a communication (for example, the sending of print data) with the printer 10 via the established WFDNW.

When the establishment of the WFDNW is completed, the CPU 82 of the portable terminal 70 sends a certificate request 502 to the printer 10 via the wireless LAN I/F 78 (i.e., via the WFDNW), for acquiring a certificate from the printer 10 to be used in communication with the WFDNW in accordance with HTTP (abbreviation of Hypertext Transfer Protocol). When receiving the certificate request 502, the CPU 32 of the printer 10 sends to the portable terminal 70 a certificate 504 used for the printer 10 to communicate with the WFDNW, and a printer ID 506 of the printer 10.

When receiving the certificate 504 and the existent printer ID 506, the CPU 82 of the portable terminal 70 determines whether the certificate 504 is an appropriate certificate. Specifically, the CPU 82 determines whether the received printer ID 506 is identical to the existent printer ID of the printer 10 to which the certificate request 502 was sent. Moreover, the portable terminal 70 acquires the wireless profile 404 and the existent printer ID of the printer 10 from the printer 10 via the NFC I/F 76. The CPU 82 determines that the certificate 504 is an appropriate certificate in the case where the existent printer ID is identical, and determines that the certificate 504 is not an appropriate certificate in the case where the existent printer ID is not identical. According to this, it is possible to ensure that the apparatus that is the sending destination of the certificate request 502 and the apparatus that is the sending source of the certificate 504 are identical. Thus, by being able to determine whether the certificate 504 is an appropriate certificate, it is possible to prevent a third party from decoding the encrypted information. Moreover, in the case of determining that the certificate 504 is not an appropriate certificate, the CPU 82 causes the display unit 74 to display a screen indicating that the certificate 504 is not an appropriate certificate, and ends the process.

In the case of determining that the certificate 504 is an appropriate certificate, the CPU 82 encrypts the AT and the virtual printer ID 201 in the memory 84, and the JOB information 240 selected by the user by using the certificate 504. Next, the CPU 82 sends HTTPS (abbreviation of Hypertext Transfer Protocol Secure) encrypted information 508 (i.e., the AT, the virtual printer ID 201, the JOB information 240, 250) to the printer 10 via the wireless LAN I/F 78. According to this configuration, it is possible to prevent the AT, etc. being known to a third party while the AT, etc. is being sent.

When receiving the encrypted information 508, the CPU 32 of the printer 10 decodes the encrypted information 508, and acquires the AT, the virtual printer ID 201, and the JOB information 240, 250 therefrom. Next, the CPU 32 determines whether it is possible to execute the server print function by using the JOB information 240 which the printer 10 received from the portable terminal 70. Specifically, for example in a case where the printer 10 is executing the server print function using JOB information received from an apparatus other than the portable terminal 70, in a case where an IP address is not set in the printer 10 (i.e., the printer 10 is not connected with the Internet), or in a case where the administrator of the printer 10 has prohibited the server print function from the portable terminal 70, the CPU 32 determines that the server print function cannot be executed by using the received JOB information 240.

In the case of determining that the server print function cannot be executed by using the JOB information which the printer 10 received from the portable terminal 70, the CPU 32 sends error information 510 to the portable terminal 70 via the wireless LAN I/F 18. The error information 510 indicates a reason of NG (failure) for not being capable of the server print function (e.g., IP address has not been set, etc.). According to this configuration, the printer 10 can inform the portable terminal 70 that the print cannot be executed in accordance with the state of the printer 10. Further, the printer 10 can send the reason of NG to the portable terminal 70 at an appropriate timing.

When receiving the error information 510 via the wireless LAN I/F 78, the CPU 82 of the portable terminal 70 causes the display unit 74 to display the reason of NG for not being capable of the server print function, represented by the error information 510, and ends the process. According to this configuration, the portable terminal 70 can learn that the printer 10 is not capable of executing the server print function. The user of the portable terminal 70 can know the reason why the printer 10 is not capable of executing the server print function. Moreover, in a modification, the reason why the server print function cannot be executed need not be displayed in the display unit 14 of the printer 10. In this case, the CPU 82 of the portable terminal 70 may not display the reason of NG in the display unit 74.

Figure 6:
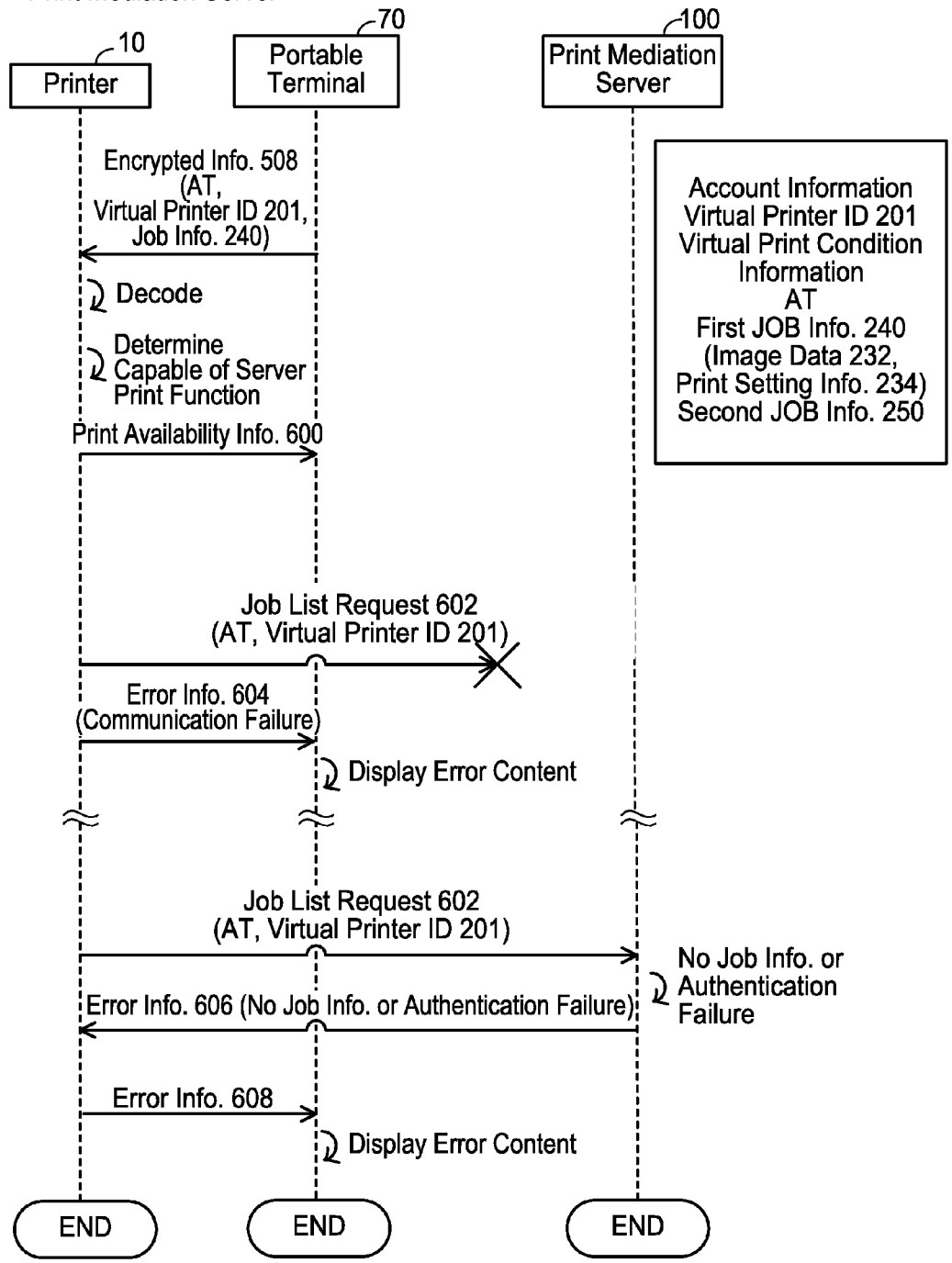
FIG. 6 shows a sequence diagram illustrating a case where, in the print process, the printer is not capable of communicating to the print mediation server.

(Case that Printer is not Capable of Communicating with Print Mediation Server; FIG. 6)

In the process of FIG. 6, the processes of the apparatuses 10, 70, 100 described in FIG. 5 are the same until the CPU 32 of the printer 10 receives the encrypted information 508, and are therefore omitted. Further, as in FIG. 5, the CPU 32 determines whether the server print function can be executed by using the JOB information which the printer 10 received from the portable terminal 70. In the case of determining that the server print function can be executed by using the JOB information which the printer 10 received from the portable terminal 70, the CPU 32 sends print availability information 600 indicating that the server print function can be executed to the portable terminal 70 via the wireless LAN I/F 18. Although not shown, when receiving the print availability information 600, the CPU 82 of the portable terminal 70 causes the display unit 74 to display a screen indicating that the server print function is available.

Next, the CPU 32 attempts to send a JOB list request 602 which includes the AT and the virtual printer ID 201 to the print mediation server 100 via the wireless LAN I/F 18 (i.e., via the Internet). Here, the CPU 32 sends error information 604 indicating that a communication with the print mediation server 100 cannot be executed to the portable terminal 70 via the wireless LAN I/F 18 (i.e., via the WFDNW) in a case where a response to the JOB list request 602 is not received within a predetermined period from sending the JOB list request 602 (for example, in case of being in a state not capable of communication with the print mediation server 100 due to power OFF, or the like).

When receiving the error information 604 via the wireless LAN I/F 78 (i.e., via the WFDNW), the CPU 82 of the portable terminal 70 displays a screen in the display unit 74 indicating that communication with the print mediation server 100 cannot be executed, based on the error information 604, and ends the process. According to this configuration, the user of the portable terminal 70 can learn that communication with the print mediation server 100 cannot be executed.

On the other hand, in case of receiving the JOB list request 602 from the printer 10, the print mediation server 100 executes authentication of the AT and the virtual printer ID 201 included in the JOB list request 602. In case of determining that the AT and the virtual printer ID 201 are not being stored (i.e., in case authentication of the AT and the virtual printer ID 201 fails), the print mediation server 100 sends error information 606 indicating fail authentication to the printer 10.

Further, in case of determining that the AT and the virtual printer ID 201 are being stored (i.e., in case authentication of the AT and the virtual printer ID 201 succeeds), the print mediation server 100 determines whether JOB information associated with the AT and the virtual printer ID 201 for which authentication succeeded is present. In the case where JOB information associated with the AT and the virtual printer ID 201 is not present, the print mediation server 100 sends error information 606 indicating no JOB information to the printer 10.

When receiving the data 606, the CPU 32 of the printer 10 sends error information 608 indicating the data 606 (i.e., fall authentication, or no JOB information) to the portable terminal 70 via the wireless LAN I/F 18.

When receiving the error information 608 via the wireless LAN I/F 78, the CPU 82 of the portable terminal 70 displays a screen in the display unit 74 indicating that authentication failed or that JOB information is not present, based on the error information 608, and ends the process. According to this configuration, the user of the portable terminal 70 can know the cause of the error.

(Case that Printer is Capable of Print Process; FIG. 7)

In the process of FIG. 7, the processes of the apparatuses 10, 70, 100 described in FIG. 5 are the same until the CPU 32 of the printer 10 receives the encrypted information 508, and are therefore omitted. Further, as in FIG. 6, in the case of determining that the server print function can be executed, the CPU 32 sends data indicating the print availability information 600, which indicates that the server print function can be executed, to the portable terminal 70, and further sends the JOB list request 602 to the print mediation server 100.

When receiving the JOB list request 602 from the printer 10, the print mediation server 100 executes authentication of the AT and the virtual printer ID 201 included in the JOB list request 602. In case of determining that the AT and the virtual printer ID 201 are being stored (i.e., in case authentication of the AT and the virtual printer ID 201 succeeds), the print mediation server 100 determines whether JOB information associated with the AT and the virtual printer ID 201 for which authentication succeeded is present. In the case where JOB information associated with the AT and the virtual printer ID 201 is present, the print mediation server 100 generates a JOB list 702 which includes two pieces of JOB ID for identifying the first JOB information 240 and the second JOB information 250 respectively, and URLs indicating the location of the print data D1, D2, to be described. Then, the print mediation server 100 sends the JOB list 702 to the printer 10.

When acquiring the JOB list 702 from the print mediation server 100 via the wireless LAN I/F 18, the CPU 32 specifies the URL corresponding to the first JOB information 240 included in the JOB list 702 as the sending destination, and supplies a print data request 704 which includes the AT and the virtual printer ID 201 via the wireless LAN I/F 18. Further, the print data request 704 also includes information (not shown) indicating a data format which can be interpreted by the printer 10. The data format is, for example, PDF (abbreviation of Portable Document Format).

When acquiring the print data request 704 from the printer 10, the print mediation server 100 executes authentication using the AT and the virtual printer ID 201 included in the print data request 704. The authentication scheme is the same as that described above. In the case of the authentication succeeding, the print mediation server 100 executes a conversion process. That is, in accordance with the print setting information 234 included in the first JOB information 240, and the information indicating data format included in the print data request 704, the print mediation server 100 converts the image data 232 included in the first JOB information 240, generating the print data D1. For example, in the case where the print setting information 234 includes "A4" as the sheet size, "N/A" as to whether it is capable of duplex printing, and "Color" as the number of colors, and the print data request 704 includes information indicating PDF format, the print mediation server 100 generates the print data D1 in the PDF format for executing a print of a color image on only one side of an A4 print sheet.

Next, the print mediation server 100 stores the generated print data D1 in a location corresponding to the URL included in the JOB list 704. Then, the print mediation server 100 sends, to the printer 10, the print data D1 which is being stored in the location corresponding to the URL which is the sending destination of the print data request 704.

The CPU 32 of the printer 10 acquires the print data D1 from the print mediation server 100 via the wireless LAN I/F 18. Then, the CPU 32 supplies the acquired print data D1 to the print execution unit 20. As a result, the print execution unit 20 executes the print process using the print data D1. Specifically, the print execution unit 20 prints an image represented by the print data D1 onto a print sheet. Thus, the user of the portable terminal 70 can acquire a printed print sheet.

Effect of Embodiment

In the present embodiment, as shown in the registration process of FIG. 2, a scheme is adopted of registering the virtual print condition information of a virtual printer in the print mediation server 100 rather than registering the print condition information of an existent printer such as the printer 10 in the print mediation server 100. Consequently, the user of the portable terminal 70 does not have to cause the printer 10 to execute a communication with the print mediation server 100 to register the print condition information (i.e., the virtual print condition information) in the print mediation server 100. Hence, the user does not need to execute an operation to access the web server function of the printer 10, and can easily register the virtual print condition information in the print mediation server 100.

Further, as shown in the print process of FIG. 5, the communication of the printer 10 and the portable terminal 70 is executed using the WFDNW. Consequently, the communication speed of the communication of the printer 10 and the portable terminal 70 can be increased. Further, the communication of the printer 10 and the portable terminal 70 can be executed even if the user of the portable terminal 70 is not located in the vicinity of the printer 10.

(Correspondence Relationship)

The portable terminal 70, the printer 10, and the print mediation server 100 are examples of "terminal device", "existent printer", and "server", respectively. The NFC I/F 76 and the wireless LAN I/F 78 are examples of "first terminal interface" and "second terminal interface", respectively. The NFC I/F 76 is an example of "communication unit" and "second printer interface". The wireless LAN I/F 78 is an example of "first printer interface". The NFC scheme and the WFD scheme are examples of "first scheme" and "second scheme", respectively.

The AT is an example of "authentication information". The virtual printer ID 201 and the virtual print condition information are an example of "virtual printer relation information". The image data 233 is an example of "image data relation information". The existent printer ID 506 is an example of "printer identification information". The adaptability information 402 is an example of "first information", and the error information 510, 604, 608 are examples of "second information".

In the portable terminal 70, the process of sending the registration request 200 of FIG. 2, and the process of receiving the login success notice 216 of FIG. 2 are examples of processes executed by "first terminal side sending unit" and "first terminal side receiving unit", respectively. In the portable terminal 70, the process of sending the encrypted information 508 of FIG. 5 to FIG. 7 is an example of a process executed by "second terminal side sending unit". In the portable terminal 70, the process of sending the submit request 230 of FIG. 3 is an example of a process executed by "third terminal side sending unit". In the portable terminal 70, the process of receiving the adaptability information 402 and the process of displaying not capable of server print function of FIG. 4 are examples of processes executed by "second terminal side receiving unit" and "first display control unit", respectively. In the portable terminal 70, the processes of receiving the error information 510, 604, 608 of FIG. 5 and FIG. 6 are examples of processes executed by "third terminal side receiving unit".

In the portable terminal 70, the process of displaying reason of NG of FIG. 5 and the process of displaying error content of FIG. 6 are examples of processes executed by "second display control unit". In the portable terminal 70, the configuration which determines that the certificate is appropriate of FIG. 5 is an example of a process executed by "determination unit".

In the printer 10, the process of receiving the encrypted information 508 of FIG. 5 to FIG. 7 is an example of a process executed by "printer side receiving unit". In the printer 10, the processes of sending the error information 510, 604, 608 of FIG. 5 and FIG. 6 are an example of processes executed by "first printer side sending unit". In the printer 10, the process of sending the certificate 504 of FIG. 5 is an example of a process executed by "second printer side sending unit". In the printer 10, the process of decoding the encrypted information 508 of FIG. 5 to FIG. 7 is an example of a process executed by "decoding unit".

In the printer, the process of executing the NFC connection 400, and the process of sending the adaptability information 402 and the wireless profile 404 of FIG. 5 are examples of processes executed by "printer side communication unit" and, in the portable terminal 70, the process of executing the NFC connection 400, and the process of receiving the adaptability information 402 and the wireless profile 404 of FIG. 5 are examples of processes executed by "terminal side communication unit". In the printer 10, the process of establishing the WFDNW of FIG. 5 is an example of a process executed by "printer side establishing unit" and, in the portable terminal 70, the process of establishing the WFDNW of FIG. 5 is an example of a process executed by "terminal side establishing unit".

(Modifications)

(1) In the first embodiment, a registration process using the OAuth scheme is executed in which the printer ID is generated first, that the login request 214 is sent afterward (see FIG. 2). However, a registration process using the Client Login scheme may be executed in which the login request 214 is sent first, then the printer ID is generated afterward.

(2) In the embodiment described above, in the registration process of FIG. 2, the portable terminal 70 sends the registration request 200 which includes the virtual print condition information to the print mediation server 100. Instead, for example, in the case where the virtual print condition information is being stored in a data server (i.e., a server provided by the vendor of the printer 10) on the Internet, the portable terminal 70 may send a registration request including a URL of the virtual print condition information to the print mediation server 100. In this case, the print mediation server 100 may acquire the virtual print condition information from the data server by using the URL of the virtual print condition information, and store the acquired virtual print condition information. Further, in the case where the print mediation server 100 is a server provided by the vendor of the printer 10, the print mediation server 100 may be storing the virtual print condition information in advance. In this case, the portable terminal 70 may send a registration request that does not include either the virtual print condition information or the URL of the virtual print condition information to the print mediation server 100.

(3) In the embodiment described above, the AT created in the registration process in FIG. 2 is registered in the print mediation server 100 in a situation that the print process in FIG. 5 is executed. In this regard, when the print process in FIG. 5 is executed, an expiration period of the AT may have finished. Hence, in the registration process in FIG. 2, the print mediation server 100 may generate not only the AT but also a so-called refresh token, and associate the refresh token with account information and the like and store the refresh token. In this case, the print mediation server 100 can generate a new token by using the refresh token when the expiration period of the AT ends, and store the new token instead of the AT. The portable terminal 70 may receive the login success notice 216 including not only the AT but also the so-called refresh token from the print mediation server 100. In the print process in FIG. 5, the portable terminal 70 may send not only the first AT but also the refresh token to the printer 10. In this case, when the expiration period of the AT ends, the printer 10 can generate a new token by using the refresh token, and acquire print data from the print mediation server 100 by using the new token. The printer 10 may periodically acquire a new token from the print mediation server 100 by using the refresh token. Further, the printer 10 may acquire a new token from the print mediation server 100 by using the refresh token in the case where a predetermined operation is executed on the operation unit 12, such as an application program activation operation, a submit operation, etc. In this modification, the refresh token is an example of "authentication information".

(4) In the embodiment described above, "authentication information" includes the virtual printer ID and the token (i.e., the AT). However, if the print mediation server 100 is configured to be capable of executing authentication by using only the virtual printer ID without using the token, "authentication information" may include only the virtual printer ID without including the token. Further, if the print mediation server 100 is configured to be capable of execution authentication by using only the token without using the virtual printer ID, "authentication information" may include only the token without including the virtual printer ID. Generally speaking, "authentication information" may be any information used to execute authentication in the print mediation server.

(5) The "virtual printer relation information" is not restricted to the virtual print condition information, but may be information indicating a virtual printer name of the virtual printer, information indicating a virtual default setting of the virtual printer, information indicating a virtual status of the virtual printer, etc. That is, "virtual printer relation information" is information to be registered in the print mediation server, and may be any information as long as the information relates to the virtual printer.

(6) In the embodiment described above, the virtual print condition information is registered in advance in the printer app. That is, the memory 84 of the portable terminal 70 stores the virtual print condition information when the printer app. is installed in the portable terminal 70. Instead, for example, a configuration may be adopted in which the user inputs the virtual print condition information to the portable terminal 70. In this case, the memory 84 may store the virtual print condition information input by the user.

(7) In the embodiment described above, in the submit process of FIG. 3, the portable terminal 70 displays the print setting selection screen using the virtual print condition information in the memory 84. Instead, the portable terminal 70 may acquire the virtual print condition information from the print mediation server 100, and display the print setting selection screen using the acquired virtual print condition information.

(8) In the embodiment described above, in the print process of FIG. 5, the printer 10 sends, to the print mediation server 100, a print data request 290 which includes information indicating "PDF" as the data format that the printer 10 is capable of interpreting (i.e., capable of printing). Instead, the printer 10 may send, to the print mediation server 100, a print data request 290 which includes information indicating "PWG-Raster" or "XPS (abbreviation of XML Paper Specification)" as the data format that the printer 10 is capable of interpreting. Generally speaking, the existent printer may send, to the print mediation server, a print data request which includes information indicating the data format that the existent printer is capable of interpreting.

(9) In the embodiment described above, in the print process of FIG. 7, since the print mediation server 100 receives the print data request 704 which includes information indicating the data format from the printer 10, the print mediation server 100 can execute the conversion process on the image data 232, and generate the print data D1 having that data format. Instead, in the registration process of FIG. 2, the portable terminal 70 may send, to the print mediation server 100, the registration request 200 which includes the virtual print condition information including information indicating the data format that the virtual printer is capable of interpreting. Further, in another modification, in the submit process of FIG. 3, the portable terminal 70 may send, to the print mediation server 100, the submit request 230 which includes the print setting information 234 including information indicating the data format that the virtual printer is capable of interpreting. According to these configurations, the printer 10 does not need to include information indicating the data format when sending the print data request 290.

(10) In the embodiment described above, the printer 10 comprises the interface memory 21, and the NFC plug 16 which is connected to the CPU 32 via the bus line. However, the printer 10 may not comprise the NFC plug 16. On the other hand, the printer 10 may have an NFC memory which is read from stored contents of another device by an NFC I/F of the other device operating in Reader mode. Stored contents of the NFC memory need not be capable of being changed by the CPU 32 and, further, need not be connected to the bus line. The NFC memory may be attached to, for example, an outer peripheral surface of a housing of the printer 10, may store at least a wireless profile, and may establish a WFDNW with a portable terminal. In this modification, the NFC memory is an example of "communication unit".

(11) In the embodiment described above, in the print processes of FIG. 6 and FIG. 7, the portable terminal 70 sends the encrypted information 508, which includes the AT and the printer ID as the authentication information, to the printer 10. In addition, the portable terminal 70 may send encrypted information which includes time information as the authentication information, to the printer 10. When receiving the time information from the portable terminal 70, the printer 10 may update the time information in accordance with the progress of time. The printer 10 may send the JOB list request 602 which includes the updated time information to the print mediation server 100. In this case, the print mediation server 100 may execute time authentication using the time information. That is, the print mediation server 100 may determine whether the received time information and the time measured by the print mediation server 100 are identical, and determine that authentication has succeeded when identical, and determine that authentication has failed when not identical.

(12) Instead of executing a wireless communication of the NFC scheme, the printer 10 and the portable terminal 70 may execute a near field wireless communication of another communication scheme (e.g., a wireless communication of the TransferJet scheme, infrared scheme, etc.) to execute a communication of the encrypted data. In this modification, the other communication scheme is an example of "near field communication scheme". Further, instead of executing the near field wireless communication, the printer 10 and the portable terminal 70 may execute a wireless communication of the normal Wi-Fi scheme to execute as communication of the encrypted data. Further, instead of executing the wireless communication, the printer 10 and the portable terminal 70 may execute a wired communication to execute a communication of the encrypted data. That is, "first interface" may not be an interface for executing a wireless communication in accordance with a near field communication scheme, but may be an interface for executing a communication in accordance with a normal Wi-Fi scheme or a wired scheme.

(13) In the embodiment described above, the printer 10 sends the wireless profile for the WFDNW to the portable terminal 70. Instead, in case of having an access point function of the normal Wi-Fi scheme, the printer 10 may send, to the portable terminal 70, an SSID, IP address, MAC address, subnet mask, and UUID (abbreviation of Universal Unique ID) of an AP used in the wireless network of the normal Wi-Fi scheme. Alternatively, in case the printer 10 should execute a communication with the portable terminal 70 using Bluetooth (registered trademark), the printer 10 may send information for pairing to be used in Bluetooth (registered trademark) to the portable terminal 70.

(14) In the embodiment described above, the screen displayed in the display unit 74 when the adaptability information 402 indicates not capable of server print function (see FIG. 4), the reason of NG displayed in the display unit 74 when the error information 510 is received (see FIG. 5), and the screen displayed in the display unit 74 when the error information 606, 608 is received (see FIG. 6) are each different. Instead, the portable terminal 70 may cause the display unit 74 to display a common screen indicating, for example, not capable of print or not capable of server print function.

(15) Instead of executing a wireless communication in accordance with the normal Wi-Fi scheme and executing a communication of various pieces of information (e.g., the registration request 200 in FIG. 2 or the like) with the print mediation server 100, the portable terminal 70 may execute a wireless communication in accordance with a cellular scheme such as 3G or 4G and execute a communication with the print mediation server 100. Further, the portable terminal 70 may execute a communication with the print mediation server 100 by executing a wired communication when the portable terminal 70 is connected to the Internet with a wired connection.

(16) The printer 10 may execute a wired communication and execute a communication of various pieces of information (e.g., the job list request 280 in FIG. 5 or the like) with the print mediation server 100 when the printer 10 is connected to the Internet by way of a wired connection.

(17) The print mediation server 100 may not be one server and may be a plurality of servers which are configured separately. For example, the print mediation server 100 may have a first server which executes each process illustrated by the registration process in FIG. 2 and a second server (i.e., a second server which is configured separately from the first server) which executes each process illustrated by the processes in and subsequent to FIG. 3.

(18) "Terminal device" may not be the portable terminal 70 and may be a desktop PC or another device (e.g., a television).

(19) In the embodiment described above, the CPU 32 of the printer 10 and the CPU 82 of the portable terminal 70 implement each process in FIG. 2 to FIG. 7 by executing programs (e.g., printer app.) in the memories 34, 84. Instead, at least one process of each process in FIG. 2 to FIG. 7 may be implemented by hardware such as a logic circuit.

What is claimed is:

1. A non-transitory computer-readable recording medium storing computer-readable instructions for a terminal device, the computer-readable instructions, when executed by one or more processors of the terminal device, causing the terminal device to perform:
    sending a registration request to a server using a second terminal interface of the terminal device without communicating with an existent printer, the registration request requesting the server to register virtual printer relation information related to a virtual printer;
    receiving authentication information from the server using the second terminal interface without communicating with the existent printer;
    communicating a wireless profile with the existent printer using a first terminal interface of the terminal device after sending the registration request and receiving the authentication information, the wireless profile configured to be used in a wireless network, which is established by using the second terminal interface, and is a wireless network to which both the terminal device and the existent printer are to belong, the first terminal interface being configured to execute a wireless communication with the existent printer in accordance with a first scheme, the second terminal interface being configured to execute a wireless communication with the existent printer in accordance with a second scheme different from the first scheme;
    establishing a belonging state based on the wireless profile and using the second terminal interface, the belonging state being a state in which both the terminal device and the existent printer belong to the wireless network; and
    sending the authentication information, which had been received from the server, to the existent printer via the established wireless network using the second terminal interface, the authentication information being associated with the virtual printer relation information in the server, and configured to be used when the existent printer acquires print data of a print target stored in the server from the server.

2. The non-transitory computer-readable recording medium as in claim 1, wherein
    the computer readable instructions, when executed by the one or more processors, further cause the terminal device to perform sending image data relation information to the server after the virtual printer relation information has been registered in the server, and
    the image data relation information relates to image data for generating the print data by the server, and is associated with the virtual printer relation information and the authentication information in the server.

3. The non-transitory computer-readable recording medium as in claim 1, wherein
    the communicating includes receiving first information using the first terminal interface from the existent printer in a case where the existent printer is not capable of executing a server print function including receiving the print data from the server and executing print of the received print data, and the computer readable instructions, when executed by the one or more processors, further cause the terminal device to perform causing a display unit of the terminal device to display a screen showing that the existent printer is not capable of executing print in a case where the first information is received.

4. The non-transitory computer-readable recording medium as in claim 1, wherein
the communicating includes receiving first information using the first terminal interface from the existent printer in a case where the existent printer is not capable of executing a server print function including receiving the print data from the server and executing print of the received print data, and
the belonging state is not established in a case where the first information is received.

5. The non-transitory computer-readable recording medium as in claim 1, wherein the computer readable instructions, when executed by the one or more processors, further cause the terminal device to perform receiving second information from the existent printer using the second terminal interface via the established wireless network, in a case where the existent printer is in at least one of the following states after the belonging state has been established: a state in which a print executing unit of the existent printer is not capable of executing print, and a state in which the existent printer is not capable of receiving the print data from the server.

6. The non-transitory computer-readable recording medium as in claim 5, wherein the computer readable instructions, when executed by the one or more processors, further cause the terminal device to perform causing a display unit of the terminal device to display a screen showing that the existent printer is not capable of executing print in a case where the second information is received.

7. The non-transitory computer-readable recording medium as in claim 5, wherein the second information is received after the authentication information has been sent to the existent printer.

8. The non-transitory computer-readable recording medium as in claim 1, wherein
the first scheme is a communication scheme in accordance with NFC (Near Field Communication) standard,
the existent printer is configured to:
allow a user to select a function setting on whether or not the existent printer executes a server print function including receiving the print data from the server and executing print of the received print data;
transition between a state in which a print executing unit of the existent printer is capable of executing print and a state in which the print executing unit of the existent printer is not capable of executing print in accordance with an operation of the existent printer; and
transition between a state in which the existent printer is capable of receiving the print data from the server and a state in which the existent printer is not capable of receiving the print data from the server in accordance with the operation of the existent printer,
the communicating includes receiving first information from the existent printer using a Reader function of the first terminal interface in a case where the function setting of not executing the server print function is selected in the existent printer, the Reader function being designated by the NFC standard, and
the computer readable instructions, when executed by the one or more processors, further cause the terminal device to perform receiving second information from the existent printer using the second terminal interface via the established wireless network in a case where the server print function cannot be executed by the existent printer after the belonging state has been established, due to the existent printer being in at least one of the state in which the print executing unit of the existent printer is not capable of executing print and the state in which the existent printer is not capable of receiving the print data from the server.

9. The non-transitory computer-readable recording medium as in claim 1, wherein
the computer readable instructions, when executed by the one or more processors, further cause the terminal device to perform receiving a certificate from the existent printer via the established wireless network using the second terminal interface after the belonging state has been established, and
the sending of the authentication information includes sending the authentication information encrypted using the received certificate to the existent printer.

10. The non-transitory computer-readable recording medium as in claim 9, wherein
the communicating includes receiving printer identification information from the existent printer using the first terminal interface, the printer identification information identifying the existent printer,
the computer readable instructions, when executed by the one or more processors, further cause the terminal device to perform determining, using the received printer identification information, whether the certificate is appropriate or not, and
the authentication information encrypted using the received certificate is sent to the existent printer via the established wireless network using the second terminal interface in a case where it is determined that the certificate is appropriate.

11. A printer comprising:
a communication unit configured to execute a wireless communication with an interface of a terminal device that executes a wireless communication in accordance with a first scheme;
a first printer interface configured to execute a wireless communication with the terminal device in accordance with a second scheme different from the first scheme;
one or more processors; and
a memory storing computer readable instructions,
wherein the communication unit is configured to communicate a wireless profile with the terminal device, the wireless profile configured to be used in a wireless network, which is established by using the first printer interface, and is a wireless network to which both the printer and the terminal device are to belong, and
wherein the computer readable instructions, when executed by the one or more processors, cause the printer to:
establish a belonging state based on the wireless profile and using the first printer interface, the belonging state being a state in which both the printer and the terminal device belong to the wireless network;
receive authentication information from the terminal device via the established wireless network using the first printer interface, the authentication information having been stored in a server by being associated with print data, and configured to be used when the printer acquires the print data from the server; and acquire the print data from the server using the received authentication information which had been received from the terminal device.

12. The printer as in claim 11, wherein the communication unit includes a second printer interface configured to execute a wireless communication with the terminal device in accordance with the first scheme.

13. The printer as in claim 11, wherein the communicating of the wireless profile by the communication unit includes sending first information to the terminal device in a case where the printer is not capable of executing a server print function including receiving the print data from the server and executing print of the received print data.

14. The printer as in claim 13, wherein the belonging state is not established in a case where the server print function cannot be executed.

15. The printer as in claim 11, further comprising:
a print executing unit configured to execute print,
wherein the computer readable instructions, when executed by the one or more processors, further cause the printer to send second information to the terminal device using the first printer interface via the established wireless network in a case where the printer is in at least one of the following states after the belonging state has been established: a state in which the print executing unit is not capable of executing print, and a state in which the printer is not capable of receiving the print data from the server.

16. The printer as in claim 15, wherein the second information is sent after the authentication information has been received from the terminal device.

17. The printer as in claim 11, further comprising:
a print executing unit configured to execute print;
wherein the first scheme is a communication scheme in accordance with NFC (Near Field Communication) standard,
the communication unit includes a second printer interface configured to execute a wireless communication with the terminal device in accordance with the first scheme, the second printer interface including an interface memory,
the printer is configured to:
allow a user to select a function setting on whether or not the printer executes a server print function including receiving the print data from the server and executing print of the received print data;
transition between a state in which the print executing unit is capable of executing print and a state in which the print executing unit is not capable of executing print in accordance with an operation of the printer; and
transition between a state in which the printer is capable of receiving the print data from the server and a state in which the printer is not capable of receiving the print data from the server in accordance with the operation of the printer,
the communicating the wireless profile by the communication unit includes sending first information stored in the interface memory to the terminal device using the second printer interface in a case where the function setting of not executing the server print function is selected in the printer, the first information indicating the function setting of not executing the server print function, and
the computer readable instructions, when executed by the one or more processors, further cause the printer to send second information to the terminal device using the first printer interface via the established wireless network in a case where the server print function cannot be executed by the printer after the belonging state has been established, due to the printer being in at least one of the state in which the print executing unit is not capable of executing print and the state in which the printer is not capable of receiving the print data from the server.

18. The printer as in claim 17, wherein the computer readable instructions, when executed by the one or more processors, further cause the printer to cause the interface memory to store the first information in response to the function setting being changed from the state capable of executing the server print function to the state not capable of executing the server print function by the user.

19. The printer as in claim 11, wherein the computer readable instructions, when executed by the one or more processors, further cause the printer to:
send a certificate to the terminal device via the established wireless network using the first printer interface after the belonging state has been established; and
decode the received authentication information using the certificate.

20. The printer as in claim 19, wherein
the communicating of the wireless profile by the communication unit includes sending printer identification information to the terminal device, the printer identification information identifying the printer, and
the computer readable instructions, when executed by the one or more processors, further cause the terminal device to send the printer identification information to the terminal device using the first printer interface via the established wireless network.

21. A communication system comprising:
a terminal device;
a printer; and
a server,
wherein the terminal device comprises
a first terminal interface configured to execute a wireless communication with the printer in accordance with a first scheme;
a second terminal interface configured to execute a wireless communication with the printer in accordance with a second scheme different from the first scheme;
one or more terminal device side processors; and
a terminal device side memory storing terminal device side computer readable instructions that, when executed by the one or more processors, cause the terminal device to:
send a registration request to the server using the second terminal interface without communicating with the printer, the registration request requesting the server to register virtual printer relation information related to a virtual printer different from the printer;
receive authentication information from the server using the second terminal interface without communicating with the printer;
communicate a wireless profile with the printer using the first terminal interface after sending the registration request and receiving the authentication information, the wireless profile configured to be used in a wireless network, which is established by using the second terminal interface, and is a wireless network to which both the terminal device and the printer are to belong;

establish a belonging state based on the wireless profile and using the second terminal interface, the belonging state being a state in which both the terminal device and the printer belong to the wireless network; and send the authentication information which had been received from the server to the printer via the established wireless network using the second terminal interface, the authentication information being associated with the virtual printer relation information in the server, and configured to be used when the printer acquires print data of a print target stored in the server from the server, the printer comprises:

a communication unit configured to execute a wireless communication with the first terminal interface in accordance with the first scheme;

a first printer interface configured to execute a wireless communication with the terminal device in accordance with the second scheme;

one or more printer side processors; and a printer side memory storing printer side computer readable instructions, wherein the communication unit is configured to communicate the wireless profile with the terminal device, and wherein the printer side computer readable instructions, when executed by the one or more printer side processors, cause the printer to:

establish the belonging state based on the wireless profile and using the first printer interface;

receive the authentication information from the terminal device via the established wireless network using the first printer interface, the authentication information having been stored in the server by being associated with the print data, and configured to be used when the printer acquires the print data from the server; and acquire the print data from the server using the received authentication information which had been received from the terminal device.

* * * * *